US012697837B2

(12) United States Patent
Antonakis

(10) Patent No.: US 12,697,837 B2
(45) Date of Patent: Aug. 4, 2026

(54) DRAWING SUBSTRATE

(71) Applicant: BIC Violex Single Member S.A., Anoixi (GR)

(72) Inventor: Ion-Ioannis Antonakis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 431 days.

(21) Appl. No.: 18/325,579

(22) Filed: May 30, 2023

(65) Prior Publication Data

US 2023/0382153 A1 Nov. 30, 2023

(30) Foreign Application Priority Data

May 31, 2022 (EP) .................................... 22176492

(51) Int. Cl.
| | |
|---|---|
| *B44D 2/00* | (2006.01) |
| *B32B 5/02* | (2006.01) |
| *B32B 7/02* | (2019.01) |
| *B43K 8/00* | (2006.01) |
| *B43L 1/00* | (2006.01) |
| *C08K 3/013* | (2018.01) |

(52) U.S. Cl.
CPC ................ *B44D 2/002* (2013.01); *B32B 5/02* (2013.01); *B32B 7/02* (2013.01); *C08K 3/013* (2018.01); *B32B 2262/0253* (2013.01); *B32B 2262/0261* (2013.01); *B32B 2262/0276* (2013.01); *B32B 2262/0284* (2013.01); *B32B 2307/4026* (2013.01); *B32B 2307/726* (2013.01); *B32B 2554/00* (2013.01)

(58) Field of Classification Search
None
See application file for complete search history.

(56) References Cited

U.S. PATENT DOCUMENTS

| | | | |
|---|---|---|---|
| 4,810,562 A | 3/1989 | Okawa et al. | |
| 4,832,984 A | 5/1989 | Hasegawa et al. | |
| 5,700,521 A * | 12/1997 | Horikiri .................. | B44D 2/00 |
| | | | 427/407.1 |
| 6,416,853 B1 | 7/2002 | Nakashima et al. | |
| 7,168,876 B2 | 1/2007 | Nakashima et al. | |
| 8,921,473 B1 | 12/2014 | Hyman | |
| 10,156,043 B2 | 12/2018 | Zhang et al. | |
| 10,441,760 B2 | 10/2019 | Selaru et al. | |
| 2005/0276935 A1 | 12/2005 | Toda et al. | |
| 2007/0287143 A1 | 12/2007 | Krongard et al. | |

(Continued)

FOREIGN PATENT DOCUMENTS

| | | | |
|---|---|---|---|
| CN | 105860665 B | 5/2019 | |
| WO | WO 2013/088858 A1 * | 6/2013 | ............... G09F 9/30 |
| WO | 2015069513 A1 | 5/2015 | |

OTHER PUBLICATIONS

WO 2013088858 A1 translation (Year: 2013).*

(Continued)

*Primary Examiner* — Alicia J Weydemeyer
*Assistant Examiner* — Nicole T Gugliotta
(74) *Attorney, Agent, or Firm* — Bookoff McAndrews, PLLC

(57) ABSTRACT

In a first aspect, the present disclosure relates to a drawing substrate, wherein the drawing substrate 100 comprises a first structure 120 attached to a second structure 110, wherein the first structure 120 is hygromorphic.

20 Claims, 3 Drawing Sheets

(56)              References Cited

U.S. PATENT DOCUMENTS

| | | | |
|---|---|---|---|
| 2009/0110920 A1 | 4/2009 | Bordener | |
| 2015/0158244 A1* | 6/2015 | Tibbits | B29C 61/04 |
| | | | 264/479 |
| 2017/0124922 A1* | 5/2017 | Kim | B32B 27/12 |
| 2017/0151733 A1* | 6/2017 | Lewis | B29C 71/0009 |
| 2018/0134068 A1 | 5/2018 | Lemay et al. | |

OTHER PUBLICATIONS

He X., Flexible and Superwettable Bands as a Platform toward Sweat Sampling and Sensing, ACS Appl. Polym. Mater. 2020, 2, 5, 2055-2062, Publication Date: Apr. 10, 2020, https://doi.org/10.1021/acsapm.0c00213, Copyright © 2020 American Chemical Society.

European Search Report issued in European Application No. 22176492.1, mailed on Nov. 17, 2022.

Jurewicz, I., King, A. A. K., Shanker, R., Large, M. J., Smith, R. J., Maspero, R., Ogilvie, S. P., Scheerder, J., Han, J., Backes, C., Razal, J. M., Florescu, M., Keddie, J. L., Coleman, J. N., Dalton, A. B., Mechanochromic and Thermochromic Sensors Based on Graphene Infused Polymer Opals. Adv. Funct. Mater. 2020, 30, 2002473. https://doi.org/10.1002/adfm.202002473.

Seo Woo Song et al., Direct 2D-to-3D transformation of pen drawings.Sci. Adv.7,eabf3804(2021).DOI:10.1126/sciadv.abf3804.

Smart Medicine Cabinet Solution—Embedded Industrial Touch panel PC, Touch Think Solutions, Copyright © Shenzhen Touch Think Intelligence Co., Ltd., https://www.touchtecs.com/medical-Industry/smart-medicine-cabinet-solution.html.

Wang L, Zhou W, Tang Q, Yang H, Zhou Q, Zhang X. Rhodamine-Functionalized Mechanochromic and Mechanofluorescent Hydrogels with Enhanced Mechanoresponsive Sensitivity. Polymers. 2018; 10(9):994. https://doi.org/10.3390/polym10090994.

* cited by examiner

DRAWING SUBSTRATE

This application claims priority from the European Patent Application No. 22176492.1, filed on May 31, 2022, its content being incorporated herein by reference.

TECHNICAL FIELD

The present disclosure relates to the field of drawing substrates. More specifically, the present disclosure relates to drawing substrates comprising hygromorphic materials.

BACKGROUND

Drawing is a well-known leisure activity, performed by adults and children alike. Drawing typically only requires a writing instrument and a drawing substrate. Drawing may improve fine motor skills, focus and creativity, especially in children.

Children, but also adults, may for example use line drawings, intended to be colored with predetermined colors. Line drawings may be especially preferred by users which are not as experienced in drawing. A plurality of line drawings may be collected in a coloring books.

However, the act of coloring may become repetitive and hence dull for the user over time. Adding a new dimension to line drawings and coloring books may increase the interest of users and may provide a distinguishing feature over previously known line drawings and coloring books.

The present disclosure relates to improved drawing substrates.

SUMMARY

In a first aspect, the present disclosure relates to a drawing substrate, wherein the drawing substrate comprises a first structure attached to a second structure, wherein the first structure is hygromorphic.

In some embodiments, the first structure may comprise a first layer and a second layer.

In some embodiments, the first layer may comprise a carrier material, in particular wherein the carrier material is porous and/or flexible.

In some embodiments, the carrier material may comprise a first fabric, more specifically wherein the first fabric comprises polymer fibers and in particular wherein the polymer fibers comprise polyamide, polyethylene terephthalate, polyester and/or polyethylene.

In some embodiments, the first layer may comprise a solvatochromic colorant, in particular a hydrochromic colorant.

In some embodiments, the solvatochromic colorant may be configured to absorb less than about 80%/cm, more specifically less than about 90%/cm and in particular less than about 95%/cm of light with a wavelength between about 380 nm to about 750 nm, when soluted.

In some embodiments, the hydrochromic colorant may be configured to absorb less than about 80%/cm, more specifically less than about 90%/cm and in particular less than about 95%/cm of light with a wavelength between about 380 nm to about 750 nm, when soluted in water.

In some embodiments, the first layer may comprise a second colorant, more specifically a non-solvatochromic colorant and in particular a non-hydrochromic colorant.

In some embodiments, the second layer may comprise a hygroexpansible material.

In some embodiments, the carrier material may be hygroinert.

In some embodiments, the second layer may comprise a hygromorphic material.

In some embodiments, the hygromorphic material may comprise a first material and a second material, wherein the first material may be configured to absorb more water compared to the second material, in particular the first material may be a hygroexpansible material and the second material may be a hygroinert material.

In some embodiments, the first material may form a first layer of the hygromorphic material and the second material may form a second layer of the hygromorphic material.

In some embodiments, the hygroexpansible material may be configured to swell and the hygroinert material may be configured not to swell, and/or the hygroexpansible material may be hydrophilic and the hygroinert material may be hydrophobic.

In some embodiments, the hygroexpansible material may comprise a hydrogel.

In some embodiments, the first material may comprise pollen paper, reduced graphene oxide, *Bacillus subtilis* spores, CNT-paper, and/or polydopamine-reduced graphene oxide.

In some embodiments, the second material may comprise a toner ink, in particular a toner ink comprising an ester of an acrylic ester, iodine-doped reduced graphene oxide, polyimide, partially reduced graphene oxide-polypyrrole, graphite, biaxially oriented polypropylene, SU-8, NOA63, poly (methyl methacrylate) and/or a styrene-acrylate copolymer.

In some embodiments, the first material may comprise oxidized and methacrylated alginate and the second material may comprise methacrylated gelatin, in particular wherein the oxidized and methacrylated alginate and the methacrylated gelatin are cross-linked.

In some embodiments, the hygromorphic material may comprise a plurality of fibers embedded within a matrix, in particular a polymeric matrix. The plurality of fibers may be hygroinert and the polymeric matrix may be hygroexpansible. The plurality of fibers may be oriented in a specific direction. By arranging the direction of the plurality of fibers, the shape obtained after water absorption by the hygromorphic material can be controlled. In another embodiment, the plurality of fibers may be hygroexpansible and the polymeric matrix may be hygroinert.

In some embodiments, the first structure may comprise a third layer, wherein the second layer of the first structure may be disposed between the third layer and the first layer of the first structure.

In some embodiments, the third layer may comprise a second fabric, more specifically wherein the second fabric may comprise polymer fibers and in particular wherein the polymer fibers may comprise polyamide, polyethylene terephthalate, polyester and/or polyethylene.

In some embodiments, the first structure may have the form of a layer.

In some embodiments, the second structure may have the form of a layer.

In some embodiments, the second structure is non-hygromorphic.

In some embodiments, the second structure may comprise a hygroinert and/or water-resistant material, more specifically water resistant paper, water resistance cardboard, Bisphenol A poly-free polymer, polyester paper, and/or polyethylene paper.

In some embodiments, the first structure may be attached to the second structure by an adhesive, in particular a water-resistant adhesive.

In some embodiments, the first structure may comprise a first section and a second section.

In some embodiments, the first section may be attached to the second structure.

In some embodiments, the second section may comprise a free end.

In some embodiments, the second structure may comprise a solvatochromic colorant and/or a non-solvatochromic colorant.

In some embodiments, the hygromorphic material may have a deformability between about 0.02/cm*%-relative air humidity to about 0.25/cm*%-relative air humidity.

In some embodiments, the hygromorphic material may have a deformability between about 0.02/cm*water content wt.-% to about 0.25/cm*water content wt.-%, wherein the water content is relative to the maximum water absorption capacity of the hygroexpansible material.

In some embodiments, the hygromorphic material may exhibit an increase of the maximum bending curvature of between about 1.0 cm$^{-1}$ to about 5.0 cm$^{-1}$, more specifically of between about 2.0 cm$^{-1}$ to about 4.0 cm$^{-1}$, and in particular of between about 2.5 cm$^{-1}$ to about 3.5 cm$^{-1}$, when a water content within the hygroexpansible material is increased from about 20 wt.-% to about 100 wt.-%, relative to the maximum water absorption capacity of the hygroexpansible material.

In some embodiments, the hygromorphic material may exhibit an increase of the maximum bending curvature from about 0.10 cm$^{-1}$ to about 3.1 cm$^{-1}$ when the water content within the hygroexpansible material is increased from about 20 wt.-% to about 100 wt.-%, relative to the maximum water absorption capacity of the hygroexpansible material.

In some embodiments, the hygromorphic material may be configured to expand in at least one direction from about 0.4% to about 1.6%, when the water content within the hygroexpansible material is increased from about 20 wt.-% to about 70 wt.-%, relative to the total weight of the hygroexpansible material.

In some embodiments, the first structure may comprise a mechanochromic material, in particular in the form of a mechanochromic layer.

In some embodiments, the mechanochromic material may comprise mechanochromic fibers, in particular mechanochromic polymer fibers.

In some embodiments, the mechanochromic layer may have a thickness between about 1 μm to about 2000 μm, more specifically between about 5 μm to about 400 μm, and in particular between about 10 μm to about 200 μm.

In some embodiments, the mechanochromic material may comprise a photonic material, a piezophotonic material, a microcrack structure material and/or a mechanophore, in particular a mechanophore-linked polymer.

In some embodiments, the mechanophore may be configured to undergo a ring-opening under mechanical stress, more specifically a reversible ring-opening under mechanical stress and in particular to transform from a spirocyclic form to a ring-opened form under mechanical stress.

In some embodiments, the mechanochromic material may comprise a mechanochromic polymer, more specifically a mechanochromic polymer comprising a rhodamine and in particular a mechanochromic rhodamine spirolactam micellar hydrogel.

In some embodiments, the mechanochromic material may comprise spheres, more specifically the spheres may be polymer spheres and in particular the polymer spheres may comprise a copolymer of methyl methacrylate, butyl acrylate and methacrylic acid.

In some embodiments, the mechanochromic material may comprise a latex, more specifically the latex may comprise the polymer spheres and in particular the latex may comprise the polymer spheres and graphene.

In some embodiments, the polymer spheres may have a size between about 100 nm to about 400 nm, more specifically between about 200 nm to about 300 nm.

In some embodiments, the mechanochromic material may have a graphene content between about 0.001 wt.-% to about 0.1 wt.-%, more specifically between about 0.005 to about 0.02 wt.-% relative to the total weight of the polymer spheres.

In some embodiments, the latex may have a water content between about 1 wt.-% to about 30 wt.-%, more specifically between about 5 wt.-% to about 15 wt.-% and in particular between about 8 wt.-% to about 12 wt.-%, relative to the total weight of the latex.

In some embodiments, the mechanochromic material may comprise silica particles and poly(ethylene glycol) phenyl ether acrylate rubber.

In some embodiments, the mechanochromic material may comprise polystyrene spheres, at least one aligned carbon nanotubes sheet and PDMS fibers.

In some embodiments, the mechanochromic material may comprise poly(butyl acrylate) spheres, 2-ethylhexyl acrylate and a polyacrylic acid hydrogel.

In some embodiments, the color change of the mechanochromic material may be reversible.

In some embodiments, the mechanochromic material may be configured to change color when exposed to a mechanical force between about 0.1 N to about 5 N.

In some embodiments, the mechanochromic material may be configured to change color when stretched by between about 50% to about 500%.

In some embodiments, the mechanochromic material may be configured to change color when exposed to a mechanical force between about 0.3 MPa to about 3 MPa.

In some embodiments, the second structure may be attached to a carrier structure.

In some embodiments, the drawing substrate may be disposed within a drawing book.

In a second aspect, the present disclosure relates to a system comprising the drawing substrate according to any preceding claim, and a writing instrument, wherein the writing instrument is configured to dispense a liquid medium comprising water.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting embodiments. Common reference numerals on different Figures indicate like or similar features.

DETAILED DESCRIPTION

Figures 1A, 1B:
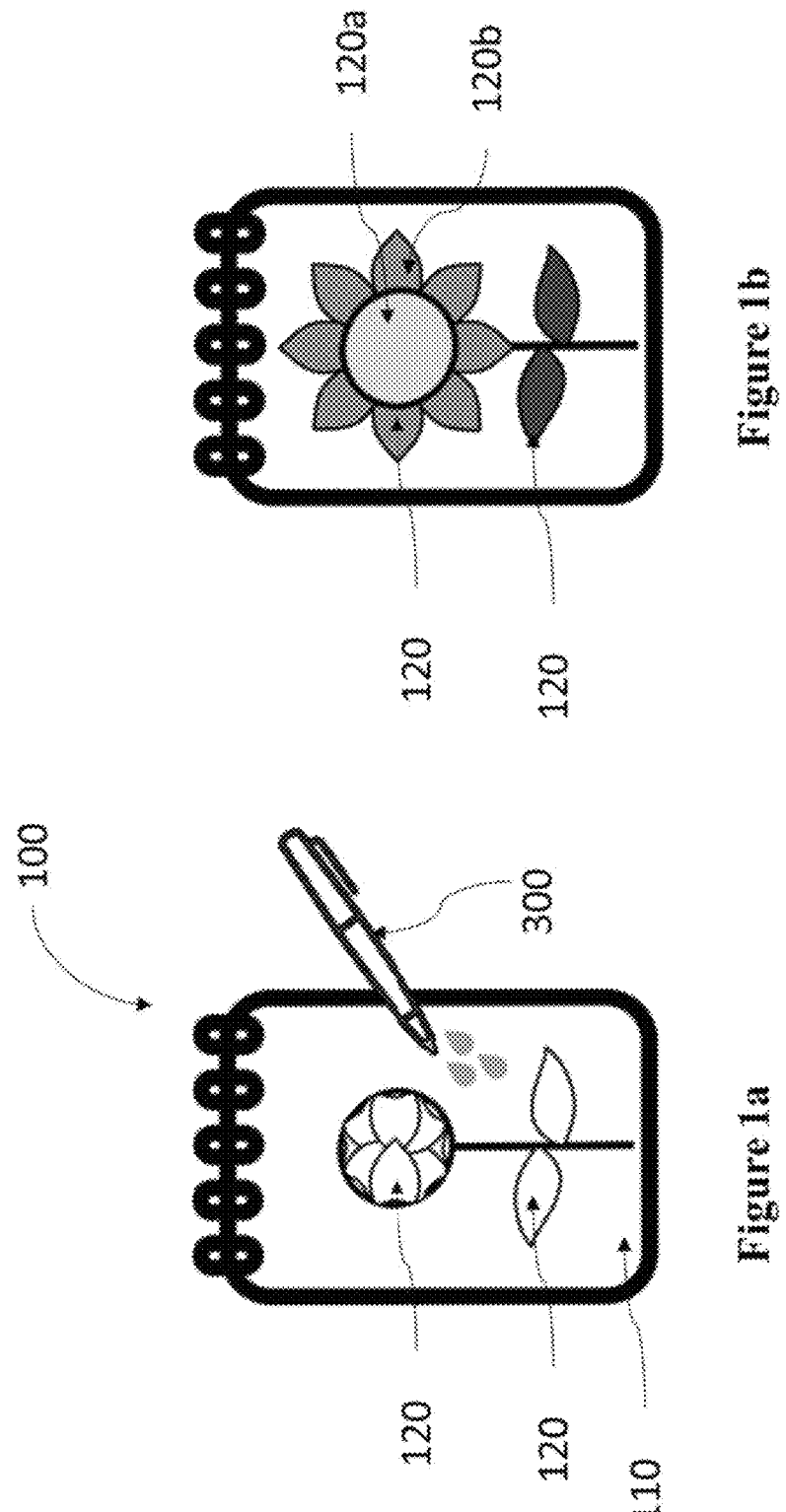
FIG. 1a shows a drawing substrate 100 according to the first aspect in a dry state attached to an arm.
FIG. 1b shows a drawing substrate 100 according to the first aspect in a wet state attached to an arm.

Hereinafter, a detailed description will be given of the present disclosure. The terms or words used in the description and the aspects of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

In a first aspect, the present disclosure relates to a drawing substrate, wherein the drawing substrate 100 comprises a first structure 120 attached to a second structure 110, wherein the first structure 120 is hygromorphic.

The term "hygromorphic first structure" within this disclosure may i.a. refer to its common meaning in the art. Additionally or alternatively, the term "hygromorphic first structure" disclosure may refer to a structure configured to change its geometry based on a water content within the structure or parts thereof. Additionally or alternatively, the term "hygromorphic first structure" may refer to a structure configured to change its geometry based on a relative humidity in ambient air. Additionally or alternatively, the term "hygromorphic first structure" may refer to a structure configured to change its curvature based on the water content within the structure or parts thereof and/or the relative humidity in ambient air. The change in geometry and/or curvature due to a change in water content in the hygromorphic structure and/or relative humidity in ambient air, may also be referred as hygromorphic action. The hygromorphic action may be in particular reversible. A material or structure configured to perform the hygromorphic action may be referred to as hygromorphic actuator.

FIGS. 1*a* and 1*b* show an embodiment of the present disclosure. FIGS. 1*a* and 1*b* show a drawing substrate 100 according to the present disclosure, wherein the drawing substrate 100 shows a sunflower. Each of the leaves may be regarded as a first structure 120 according to the present disclosure and the underlying substrate as the second structure 110. In FIG. 1*a* the first structure 120 is in a dry state and in FIG. 1*b* the first structure 120 is in a wet state. The terms "dry state" and "wet state" are relative to one another, in particular the first structure 120 may comprise more water relative to its total weight in the wet state, compared to its dry state. In the dry state, the first structure 120 is in a first configuration. In FIG. 1*a*, in the dry state the sunflower's ray florets are folded over one another into the center of the flower head. When water is added to the drawing substrate 100 and in particular the sunflower's ray florets, the folded over ray florets may extend out of the center to form the unfolded flower head due to the hygromorphic action, as shown in FIG. 1*b*. The user may utilize the drawing substrate 100 by drawing on specific parts, such as the ray florets, with water to prompt the hygromorphic action.

In some embodiments, the first structure 120 may comprise a first layer 140 and a second layer 130. The term "layer" within this disclosure may i.a. refer to its common meaning in the art. Additionally or alternatively, the term "layer" may refer to a structure, wherein the structure is greater in a first and second dimension compared to a third dimension, in particular wherein the first and second dimension are at least 3 times greater, more specifically at least 5 times greater and in particular at least 10 times greater than the first dimension. Additionally or alternatively, the term "layer" may refer to a structure wherein the structure has a continuous thickness, in particular wherein the thickness is the third dimension. The term "continuous thickness" may refer to at least 80% of the area defined by the first and second dimension having a variation of thickness in the third dimension of less than 30%, in particular less than 15%, relative to the mean thickness. It should be noted that a layer according to the aforementioned definition may comprise, in some embodiments, gaps in parts of the layer. The presence of gaps may, in some embodiments, improve the hygromorphic action.

The first layer 140 may comprise a carrier material, in particular wherein the carrier material is porous and/or flexible. The flexibility may allow the hygromorphic action to occur, as a stiff material may prevent the change in geometry, in particular in curvature. The first layer 140 may be hygroinert, in particular the carrier material may be hygroinert. In some embodiments, the second layer 130 may comprise a hygroexpansible material. The combination of the first layer 140 being hygroinert and the second layer 130 being hygroexpansible may form a hygromorphic actuator. The mechanism will be explained below.

In some embodiments, the carrier material may comprise a first fabric, more specifically the first fabric may comprise polymer fibers and in particular the polymer fibers may comprise polyamide, polyethylene terephthalate, polyester and/or polyethylene.

Additionally or alternatively, the second layer 130 may comprise a hygromorphic material. Hence, the shape change of the first layer 140 may solely be determined by the shape change of the second layer 130, wherein the second layer 130 solely performs the hygromorphic action.

The term "hygromorphic material" within this disclosure shall not be limited to a chemically continuous material. In some embodiments, the "hygromorphic material" may be in the form of multiple distinct layers placed adjacent to one another, which as an aggregate lead to the hygromorphic action. Additionally or alternatively, the "hygromorphic material" may, in some embodiments, comprise fibers embedded within a matrix.

In some embodiments, the hygromorphic material may comprise a first material 230 and a second material 240, wherein the first material 230 may be configured to absorb more water compared to the second material 240, in particular wherein the first material 230 may be a hygroexpansible material and the second material 240 may be a hygroinert material. The combination of the hygroexpansible material and the hygroinert material may also form a hygromorphic actuator.

In some embodiments, the hygroexpansible material may be configured to swell and the hygroinert material may be configured not to swell. The hygroexpansible material may be hydrophilic and the hygroinert material may be hydrophobic.

The term "hygroexpansible material" within this disclosure i.a. to its common meaning in the art. Additionally or alternatively, the term "hygroexpansible material" may refer to a material configured to absorb water and/or to increase its volume when absorbing water. Additionally or alternatively, the term "hygroexpansible material" within this disclosure may refer to a material configured to absorb up to at least 10 wt.-%, more specifically up to at least 30 wt.-% and in particular up to at least 70 wt.-% water, relative to the total weight of the hygroexpansible material including the water and to increase its volume when absorbing water by at least 0.1% per 1 wt.-% water, more specifically at least 0.3%) per 1 wt.-% water and in particular 0.5% per 1 wt.-% water, wherein the water content is measured relative to the total weight of the hygroexpansible material. The absorption of water and/or increase in volume when absorbing water may be reversible. It should be noted, that within this disclosure, water penetrating into a materials pores, in particular a hygroinert material's pores, shall not be regarded as water absorption.

The term "hygroinert material" within this disclosure i.a. to its common meaning in the art. Additionally or alternatively, the term "hygroinert material" within this disclosure may refer to a material configured to not absorb water. Additionally or alternatively, the term "hygroinert material" may refer to a material configured to absorb less than 5% wt.-%, more specifically less than 1 wt.-% and in particular less than 0.1 wt.-% water, relative to the total weight of the hygroinert material. Additionally or alternatively, the term "hygroinert material" may refer to a material configured to prevent water from passing therethrough.

Figures 2A, 2B:
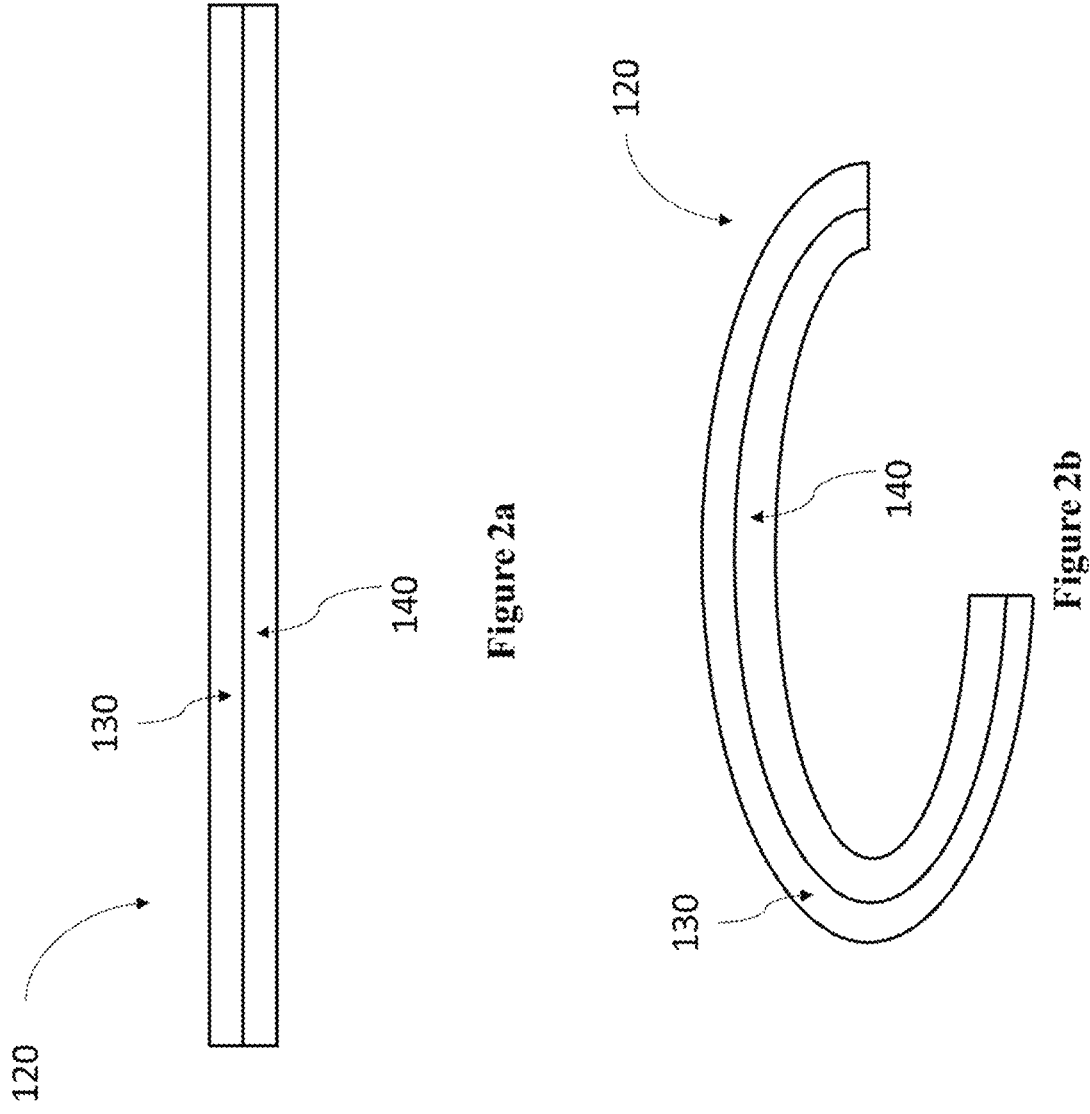
FIG. 2a shows a schematic structure of the first structure 120 and it's first layer 140 and second layer 130 in the dry state.
FIG. 2*b* shows a schematic structure of the first structure 120 and it's first layer 140 and second 130 layer in the wet state.

FIGS. 2a and 2b depict a schematic of the hygromorphic actuation mechanism. FIGS. 2a and 2b show the first layer 140 comprising a carrier material and the second layer 130 comprising the hygroexpansible material, in particular wherein the carrier material is a hygroinert material. The first layer 140 and second layer 130 may be arranged adjacent to one another. However, the first layer 140 and second layer 130 may also be present in other geometries. The first layer 140 and second layer 130's 140 geometries may be adjusted to achieve a desired hygromorphic effect. In some embodiments, the second layer 130 may not be a coherent structure but instead a plurality of hygroexpansible regions connected to the first layer 140. The first layer 140 and second layer 130 are not required to be arranged adjacent one another to achieve the hygromorphic actuation. In some embodiments, other layers may be arranged between the layers.

The second layer 130 may swell more compared to the first layer 140, as the second layer 130 may be hygroexpansible and the first layer 140 may be hygroinert. As the second layer 130 expands at greater rate or to greater degree than the first layer 140, the first structure 120 may bend towards the first layer 140, as depicted in FIG. 2b. The mechanism of the hygromorphic effect may be similar to that of a bimetallic strip, however whereas a bimetallic strip is configured to shape-shift when exhibiting to a change in temperature, the hygromorphic material is configured to shape-shift when exhibiting a change in water content.

Figures 3A, 3B:
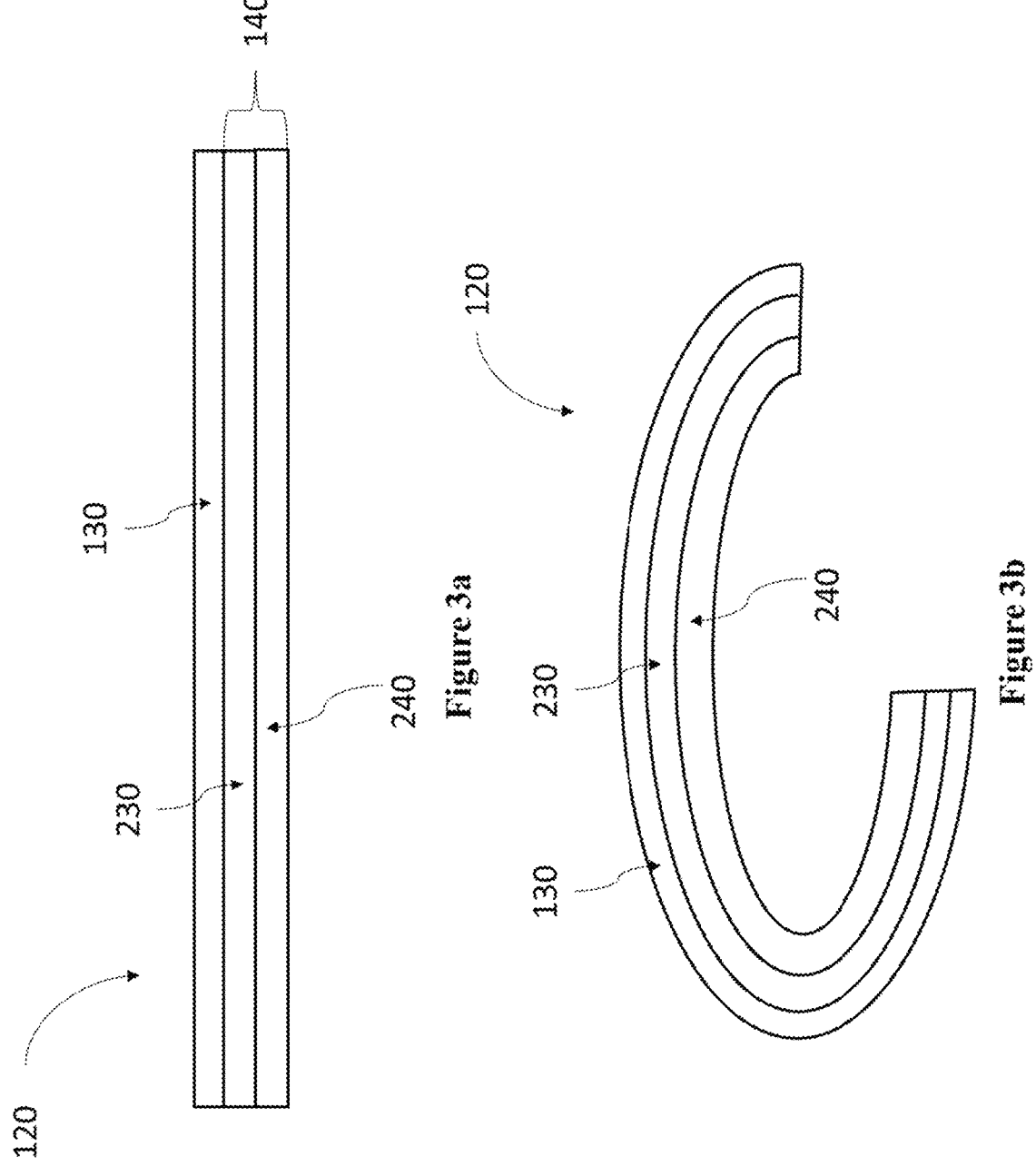
FIG. 3*a* shows a schematic structure of the first structure 120 and it's first material 230 and second 240 material in the dry state.
FIG. 3*b* shows a schematic structure of the first structure 120 and it's first material 230 and second 240 material in the wet state.

FIGS. 3a and 3b depict another schematic of the hygromorphic actuation mechanism. FIGS. 3a and 3b show a first layer 140 comprising the hygromorphic material comprising the first material 230 and the second material 240, as well as the first layer 140. The depicted first material 230 may be configured to swell more than the second material 240. In particular, the depicted first material 230 may comprise a hygroexpansible material and the depicted second material 240 may comprise a hygroinert material. The first material 230 and second material 240 are depicted as layers adjacent to one another. However, the first material 230 and second material 240 may also be present in other geometries.

The swelling of the first material 230 may lead to the dimensions of the first material 230 expanding, while the second material 240 retains its dimensions. The first material 230 expanding, while the second material 240 retains its dimensions may result in the hygromorphic effect of the hygromorphic first structure 120. As the first material 230 expands at greater rate or to greater degree than the second material 240, the first structure 120 may bend towards the second material 240, as depicted in FIG. 3b. Furthermore, this also bends the first layer 140. The first layer 140 may be flexible to undergo the bending.

In another embodiment, the hygromorphic material may comprise at least two hygroexpansible materials, wherein a first hygroexpansible material undergoes a greater expansion of one or more dimensions compared to the second hygroexpansible material, when absorbing water. In some embodiments, the first hygroexpansible material may be configured to absorb more water compared to the first hygroexpansible material.

In some embodiments, the hygroexpansible material may comprise a hydrogel. The term "hydrogel" within this disclosure may refer to crosslinked hydrophilic polymers, in particular crosslinked hydrophilic polymers which do not dissolve in water. Hydrogels may absorb great amounts of water, e.g. up to 600 times their dry weight, while retaining defined structures. It should be noted, that within this disclosure, a hydrogel itself shall not fall under the term "hygromorphic material", as hydrogels typically only experience a change in volume and not in geometry, e.g. curvature.

In some embodiments, the first material 230, in particular the hygroexpansible material, may comprise pollen paper, reduced graphene oxide, *Bacillus subtilis* spores, CNT-paper, and/or polydopamine-reduced graphene oxide.

In some embodiments, the second material 240, in particular the hygroinert material, may comprise toner ink, in particular a toner ink comprising an ester of an acrylic ester, iodine-doped reduced graphene oxide, polyimide, partially reduced graphene oxide-polypyrrole, graphite, biaxially oriented polypropylene, SU-8, NOA63, poly(methyl methacrylate) and/or a styrene-acrylate copolymer In some embodiments, the hygromorphic material may comprise hydroxyethyl cellulose with graphene oxide, in particular wherein the graphene oxide and the hydroxyethyl cellulose are cross-linked by citric acid. The hygromorphic action of this material may be preset. The material is described in more depths in "Bai and Cheng, 2017, A fast water-induced shape memory polymer based on hydroxyethyl cellulose/graphene oxide composites, https://doi.org/10.1016/j.compositesa.2017.09.003", which is incorporated herein by reference.

In some embodiments, the first material 230 may comprise oxidized and methacrylated alginate and the second material 240 may comprise methacrylated gelatin, in particular wherein the oxidized and methacrylated alginate and the methacrylated gelatin are cross-linked.

In some embodiments, the hygromorphic material may comprise a plurality of fibers embedded within a matrix, in particular a polymeric matrix. The plurality of fibers may be hygroinert and the polymeric matrix may be hygroexpansible. The plurality of fibers may be oriented in a specific direction. By arranging the direction of the plurality of fibers, the shape obtained after water absorption by the hygromorphic material can be controlled. In another embodiment, the plurality of fibers may be hygroexpansible and the polymeric matrix may be hygroinert.

In some embodiments, the first layer 140 may comprise a solvatochromic colorant, in particular a hydrochromic colorant. As stated above, in some embodiments the first structure 120 may comprise a carrier material wherein the carrier material is porous. In some embodiments, the first fabric may be porous. The solvatochromic colorant may be deposited into the pores of the carrier material. For example, a hydrochromic ink produced the company Good Life Innovation Ltd. (Special FX Creative), United Kingdom may be used as a hydrochromic colorant. Suitable hydrochromic ink compositions may also be found in WO2015069513A1, U.S. Pat. Nos. 4,810,562 and 6,416,853.

The solvatochromic colorant may be configured to absorb less than about 80%/cm, more specifically less than about 90%/cm and in particular less than about 95%/cm of light with a wavelength between about 380 nm to about 750 nm, when soluted. In particular, the hydrochromic colorant may be configured to absorb less than about 80%/cm, more specifically less than about 90%/cm and in particular less than about 95%/cm of light with a wavelength between about 380 nm to about 750 nm, when soluted in water. Similarly, the solvatochromic colorant may be configured to absorb more than about 80%/cm, more specifically more than about 90%/cm and in particular more than about 95%/cm of light with a wavelength between about 380 nm to about 750 nm, when soluted. In particular, the hydrochromic colorant may be configured to absorb more than about 80%/cm, more specifically more than about 90%/cm and in particular more than about 95%/cm of light with a wavelength between about 380 nm to about 750 nm, when soluted in water.

The first layer 140 or parts thereof may be colored. In some embodiments, the carrier material may be colored or comprise a colorant, such as pigments or dyes. In some embodiments, the first layer 140 may comprise a second colorant, more specifically a non-solvatochromic colorant and in particular a non-hydrochromic colorant.

When the solvatochromic colorant is unsoluted it may be opaque. The solvatochromic colorant may also exhibit a color, for example black, blue, magenta, green, brown, orange or vermillion when unsoluted. When a solvent is added to first layer 140 or the first structure 120, the solvatochromic colorant may be soluted, leading to the solvatochromic colorant turning transparent. As a result, the color of the first layer 140, e.g. the colored carrier material may become visible. In some embodiments, the carrier material within the sunflower's ray florets may be yellow or comprise a non-hydrochormic yellow colorant and comprise a hydrochormic colorant. When the first structure 120 is in a dry state, the hydrochromic colorant may be opaque and hence the yellow color is not or barely noticeable to the user. The user may add water to the first structure 120, in particular, the ray florets. Due to the water the hydrochromic colorant may be soluted, which may turn the hydrochromic colorant transparent. As a result, the yellow color may become visible to the user. Further, this may occur at the same time as the hygromorphic action. Thus, in the embodiment shown in FIG. 3, the ray floret may unfold and turn yellow at the same time.

In some embodiments, the solvatochromic colorant may be a reversible solvatochromic colorant. The reversible solvatochromic colorant may be configured to change from being opaque to being transparent, when soluted in a solvent and return to its opaque state, when the solvent is removed.

In some embodiments, the first structure 120 may comprise a third layer, wherein the second layer 130 of the first structure 120 may be disposed between the third layer and the first layer 140 of the first structure.

In some embodiments, the third layer may comprise a second fabric, more specifically wherein the second fabric may comprise polymer fibers and in particular wherein the polymer fibers may comprise polyamide, polyethylene terephthalate, polyester and/or polyethylene.

The third layer may provide improved mechanical properties to the first structure 120. In some embodiments, the hygroexpansible material or hygromorphic material comprised within the first structure 120 may have limited resistance to damage. As mentioned above, the hygroexpansible material may comprise a hydrogel. Hydrogels, in particular when swollen with water, may exhibit poor mechanical properties and may easily be damaged. Additionally or alternatively, the third layer may also comprise a solvatochromic colorant and hence also exhibit a color change when exposed to a solvent, such as water.

The first layer 140 may be facing towards the user and/or away from the second structure 110, in particular when the first structure 120 is in the wet state. The first layer 140 may be facing away from the user and/or towards the second structure 110, in particular when the first structure 120 is in the wet state.

In some embodiments, the first structure 120 may have the form of a layer. Further, the second structure 110 may have the form of a layer. In some embodiments, the second structure 110 is non-hygromorphic. The second structure 110 being non-hygromorphic may allow the first structure 120 to better lift off from the second structure 110.

In some embodiments, the second structure 110 may comprise a hygroinert and/or water-resistant material, more specifically water resistant paper, water resistance cardboard, Bisphenol A poly-free polymer, polyester paper, and/or polyethylene paper.

In some embodiments, the second structure 110 may also comprise a solvatochromic colorant and/or a non-solvatochromic colorant.

The first structure 120 may be attached to the second structure 110 by an adhesive, in particular a water-resistant adhesive. In some embodiments, the first structure 120 may comprise a first section 120a and a second section 120b, wherein the first section 120a is attached to the second section 120b. In particular, the first section 120a may be attached to the second section 120b in an attachment area. The second section 120b may comprise a free end. In some embodiments, the flower bulb depicted in FIG. 1 may only be attached to the second structure 110 in the first section, which may be for example the flower's disc floret. In some embodiments, the second section 120b may not comprise the adhesive. In some embodiments, the ray florets depicted in FIG. 1 may not comprise the adhesive. In some embodiments, the ray florets depicted in FIG. 1 may be free ends, which may allow the ray florets to significantly lift off the underlying second structure 110 when water is absorbed by the first structure.

The term "free end" may refer to a structure not specifically secured in a way that will effectively prevent its translation. Additionally or alternatively, the term "free end" may refer to a structure which may rotate and/or bend, in particular without a second structure 110 being forced to rotate and/or bend with the structure. Additionally or alternatively, the term "free end" may refer to a structure configured to rotate when torque is applied, to bend when a lateral force is applied but not to translate when a normal force pulling the "free end" away from the attachment area is applied. Additionally or alternatively, the term "free end" may refer to a structure configured to transfer torque, lateral forces and/or normal forces only in the attachment area. The free end may allow the second section 120b to move freely relative to the second structure 110. In some embodiments, the ray florets depicted in FIGS. 1A and 1B being free ends, may allow the ray florets to significantly lift off the underlying second structure 110 when absorbing water.

In some embodiments, the hygromorphic material may exhibit an increase of the maximum bending curvature of between about 1.0 cm$^{-1}$ to about 5.0 cm$^{-1}$, more specifically of between about 2.0 cm$^{-1}$ to about 4.0 cm$^{-1}$, and in particular of between about 2.5 cm$^{-1}$ to about 3.5 cm$^{-1}$, when a water content within the hygroexpansible material is increased from about 20 wt.-% to about 100 wt.-%, relative to the maximum water absorption capacity of the hygroexpansible material. The maximum bending curvature may be achieved within up to 5 minutes, more specifically up to 3 min and in particular within 1 minute of exposure to water. The maximum bending curvature of the hygromorphic material may be the same as the maximum bending curvature of the substrate 100. Methods for determining the maximum bending curvature are known in the art. In some embodiments, the maximum bending curvature may be measured by taking images of the substrate 100, in particular a side-view of the substrate 100, at different water contents, in particular 20 wt.-% and 100 wt.-%, relative to the maximum water absorption capacity of the hygroexpansible material. The images may then be digitally analyzed by fitting a circle to the substrate's curvature. The reciprocal of the radius of the smallest circle fitted to the substrate's curvature may then be taken as the maximum bending curvature.

In some embodiments, the hygromorphic material may exhibit an increase of the maximum bending curvature from about 0.10 cm$^{-1}$ to about 3.1 cm$^{-1}$ when the water content within the hygroexpansible material is increased from about 20 wt.-% to about 100 wt.-%, relative to the maximum water absorption capacity of the hygroexpansible material.

In some embodiments, the hygromorphic material may have a deformability between about 0.02/cm*%-relative air humidity to about 0.25/cm*%-relative air humidity. The deformability may be defined as the maximum bending curvature divided by the relative air humidity at which the maximum bending curvature is achieved.

In some embodiments, the hygromorphic material may have a deformability between about 0.02/cm*water content wt.-% to about 0.25/cm*water content wt.-%, wherein the water content is relative to the maximum water absorption capacity of the hygroexpansible material. The deformability may be defined as the bending curvature divided by the water content at which the bending curvature is achieved.

In some embodiments, the hygromorphic material may be configured to expand in at least one direction from about 0.4% to about 1.6%, when the water content within the hygroexpansible material is increased from about 20 wt.-% to about 70 wt.-%.

In some embodiments, the first structure 120 may comprise a mechanochromic material, in particular in the form of a mechanochromic layer.

The term "mechanochromic material" within this disclosure may i.a. refer to its common meaning in the art. Additionally or alternatively, the term "mechanochromic material" within this disclosure may refer to a material configured to change its colour based on a change of the mechanochromic material's geometry. Additionally or alternatively, the term "mechanochromic material" may refer to a material configured to change its color based on a mechanical stress and/or strain within the mechanochromic material. Additionally or alternatively, the term "mechanochromic material" may refer to a material configured to change its color based on a mechanical-stress and/or strain induced change in molecular structure, intermolecular interaction, or formation and/or change of photonic and/or morphological structures.

The mechanochromic material may act in synergy with hygromorphic action. The hygromorphic material, when it absorbs water, may change the geometry of the substrate 100 due to its hygromorphic action. The change of the substrates geometry may result in a change in the mechanochromic material's geometry and/or induce stress into the mechanochromic material. The mechanochromic material may then change its colour due to the change in geometry and/or induced stress.

In some embodiments, the ray floret depicted in FIG. 1, may appear in a first color when dry. When water is absorbed by the first structure, the ray floret may unfold and furthermore change color during the unfolding process due to the mechanochromic material. The mechanochromic layer may have a thickness between about 1 μm to about 2000 μm, more specifically between about 5 μm to about 400 μm, and in particular between about 10 μm to about 200 μm.

In some embodiments, the mechanochromic material may be comprised in the first layer 140. In an embodiment, the mechanochromic material may be attached to a hygroexpansible material in the second layer 130, such that the mechanochromic material forms a hygromorphic actuator together with the hygroexpansible material. Alternatively or additionally, the mechanochromic material may be attached to the first layer 140. Alternatively or additionally, the mechanochromic layer may be attached to a hygromorphic material. The mechanochromic material may provide the same effects as the solvatochromic colorant. In particular, the mechanochromic material may provide a color change when water is added to the first structure 120. However, instead of turning transparent due to solvation in water, the mechanochromic material may change color due to the mechanochromic effect.

In some embodiments, the mechanochromic material may comprise a photonic material, a piezophotonic material, a microcrack structure material and/or a mechanophore, in particular a mechanophore-linked polymer. The term "mechanophore" within this disclosure may i.a. refer to its common meaning in the art. Additionally or alternatively, the term "mechanophore" may relate to a molecule or molecular unit configured to change its color when exposed to stress or strain. Mechanophores may be in particular inserted or cross-linked into polymers or materials comprising polymers.

The mechanophore may be configured to undergo a ring-opening under mechanical stress, more specifically a reversible ring-opening under mechanical stress and in particular to transform from a ring-closed form, in a particular a spirocyclic form, to a ring-opened form under mechanical stress. The mechanophores may exhibit a first color or no color when in the ring-closed form and a second color when in the ring-opened form.

In some embodiments, the mechanochromic material may comprise mechanochromic fibers, in particular mechanochromic polymer fibers. In some embodiments, the mechanochromic fibers may comprise a spiropyran-functionalized polymer, in particular spiropyran-functionalized poly(methyl acrylate). The durability of the mechanochromic fibers may be improved by blending the spiropyran-functionalized polymer with another polymer, for example poly(methyl methacrylate). The spiropyran may act as a mechanophore and the polymer may be configured to transfer stress to the spiropyran.

Mechanochromic fibers are for example described in "Colaco et al., 2020, Mechanochromic Microfibers Stabilized by Polymer Blending, https://doi.org/10.1021/acsapm.0c00213", which is incorporated herein by reference.

In some embodiments, the mechanochromic material may comprise a mechanochromic polymer, more specifically a mechanochromic polymer comprising a rhodamine and in particular a mechanochromic rhodamine spirolactam micellar hydrogel. Rhodamines, in particular rhodamine spirolactams, may occur in a ring-closed form and a ring-opened form. The ring opening of some rhodamines, in particular rhodamine spirolactams may be force-induced, in particular stress-induced, hence rhodamine spirolactam may be a mechanophore. The polymer may transfer forces, in particular stress, to the rhodamine. In particular, the hydrogel may transfer forces into the micelles, wherein the micelles comprise rhodamine spirolactam. In some embodiments, the micelles may be formed of tween 80. The micelles may comprise an acrylate polymer. In particular, the acrylate polymer may cross-link the rhodamine within the micelles. In some embodiments, the hydrogel may be formed of an acrylamide polymer, and in particular the micelles may be cross-linked by the acrylamide polymer. When mechanical stress is applied to the hydrogel, the stress may be transferred to the micelles via the acrylate polymer. The micelles may deform due to the induced stress, leading to stress induced upon the acrylate polymer. The force induced on the acrylate polymer may be transferred to the rhodamines due to the cross-links between the rhodamines and the acrylate polymer, leading to a transformation of the rhodamine from the ring-closed state to the ring-opened state. Synthesis of a rhodamine spirolactam hydrogel is described in "Wang et al., 2018, Rhodamine-Functionalized Mechanochromic and Mechanofluorescent Hydrogels with Enhanced Mechanoresponsive Sensitivity, https://doi.org/10.3390/polym10090994", which is herein incorporated by reference.

In some embodiments, the mechanochromic material may comprise particles, in particular wherein the particles are spheres. More specifically the spheres may be polymer spheres and in particular the polymer spheres may comprise a copolymer of methyl methacrylate, butyl acrylate and methacrylic acid. In some embodiments, the particles may have a size between about 100 nm to about 400 nm, more specifically between about 200 nm to about 300 nm. In some embodiments, the mechanochromic material may comprise a latex. In particular, the particles described above may be present in the latex. The term "latex" within this disclosure may refer to emulsions of a polymer in a fluid, more specifically to an emulsion of polymer particles in water, and in particular an emulsion of polymer microparticles in water. The latex may be an elastic solid or a gel. More specifically the latex may comprise the polymer spheres and in particular the latex may comprise the polymer spheres and graphene. The graphene may be present in the form of graphene flakes comprising multiple layer of graphene. In some embodiments, the graphene may be exfoliated graphene flakes. In some embodiments, the graphene may have a size between about 150 nm to about 500 nm, more specifically between about 300 nm to about 400 nm in its greatest expansion. The latex may have a water content between about 1 wt.-% to about 30 wt.-%, more specifically between about 5 wt.-% to about 15 wt.-% and in particular between about 8 wt.-% to about 12 wt.-%, relative to the total weight of the latex. The latex may have undergone water evaporation to form a microstructure of colloidal crystals. The colloidal crystals may be formed of the polymer particles and may be enhanced by the graphene. The graphene may be trapped in the latex at the interstitial spaces between polymer particles and improve the assembly of the particles into colloidal crystals. The graphene may be replaced by graphene oxide. The term "colloidal crystal" within this disclosure may refer to an ordered array of colloid particles. The particles, in particular the polymer spheres, may be the colloid particles. The latex, in particular the colloidal crystals, may form a photonic material, in particular photonic crystals.

The term "photonic crystal" within this disclosure i.a. refers to its common meaning in the art. Additionally or alternatively the term "photonic crystal" may refer to a plurality of layers affecting the motion of light (photons), in particular a plurality of layers affecting the motion of light (photons) exhibiting a periodicity. Additionally or alternatively the term "photonic crystal" may refer to a plurality of layers having a photonic band-gap in at least one dimension.

Without wishing to be bound by theory, the photonic crystals may affect the motion of photons, in particular crystals may affect the motion of photons by exhibiting a photonic band-gap. The photonic band-gap allows light with a wavelength outside the photonic band-gap range to propagate through the plurality of layers, while light with a wavelength in the range of the photonic band-gap range cannot propagate. For light to be diffracted, the periodicity of a plurality of layers must correspond approximately to half of the wavelength of the light to be diffracted. The aforementioned layers may be formed by the aforementioned particles, in particular polymer spheres, wherein the particles are arranged to form a repeating structure, in particular a repeating layer structure. The photonic band-gap may therefore depend upon the periodicity of the layers or particles. When stress is induced into the latex, the distance between the particles, in particular the layers formed by the particles may change, in particular increase, which may change the photonic band gap, which again may change the color displayed by the latex. In some embodiments, the mechanochromic material may have a graphene content between about 0.001 wt.-% to about 0.1 wt.-%, more specifically between about to about 0.02 wt.-% relative to the total weight of the polymer spheres.

A mechanochromic material comprising a latex comprising graphene is described in "Jurewicz et al., 2020, Mechanochromic and Thermochromic Sensors Based on Graphene Infused Polymer Opals, https://doi.org/10.1002/adfm.202002473", which is incorporated herein by reference.

The following mechanochromic materials may also form photonic crystals. The mechanochromic material may comprise silica particles and poly(ethylene glycol) phenyl ether acrylate rubber. The silica particles may be the particles described above. Alternatively or additionally, the mechanochromic material may comprise poly(butyl acrylate) spheres, 2-ethylhexyl acrylate and a polyacrylic acid hydrogel. The poly(butyl acrylate) spheres may be the polymer spheres referred to above. Additionally or alternatively, the mechanochromic material may comprise polystyrene spheres, at least one aligned carbon nanotubes sheet and PDMS fibers. The polystyrene spheres may be the polymer spheres referred to above.

In some embodiments, the color change of the mechanochromic material may be reversible. The color change being reversible, in particular in conjunction with the hygromorphic action being reversible may allow reusing the substrate.

In some embodiments, the mechanochromic material may be configured to change color when exposed to a mechanical force between about 0.1 N to about 5 N. In some embodiments, the mechanochromic material may be configured to change color when exposed to a mechanical force between about 0.3 MPa to about 3 MPa. The mechanical force may be in particular stress.

In some embodiments, the mechanochromic material may be configured to change color when stretched by between about 50% to about 500%. It should be noted, that the stretching of the mechanochromic material, may be greater than the expansion of the hygroexpansible material, due to the change in curvature of the first structure 120.

In some embodiments, the second structure 110 may be attached to a carrier structure. The carrier structure may improve the mechanical stability of the second structure 110 and/or the overall drawing substrate 100.

In some embodiments, the drawing substrate 100 may be disposed within a drawing book.

In a second aspect, the present disclosure relates to a system comprising the drawing substrate 100 as described above, and a writing instrument, wherein the writing instrument 300 is configured to dispense a liquid medium comprising water.

Although the present disclosure is defined in the attached claims, it should be understood that the present disclosure can also (alternatively) be defined in accordance with the following aspects:

1. A drawing substrate, wherein the drawing substrate comprises a first structure attached to a second structure, wherein the first structure is hygromorphic.

2. The drawing substrate according to aspect 1, wherein the first structure comprises a first layer and a second layer.

3. The drawing substrate according to aspect 2, wherein the first layer comprises a carrier material, in particular wherein the carrier material is porous and/or flexible.

4. The drawing substrate according to aspect 3, wherein the carrier material comprises a first fabric, more specifically wherein the first fabric comprises polymer fibers and in particular wherein the polymer fibers comprise polyamide, polyethylene terephthalate, polyester and/or polyethylene.

5. The drawing substrate according to any one of aspects 2 to 4, wherein the first layer comprises a solvatochromic colorant, in particular a hydrochromic colorant.

6. The drawing substrate according to aspect 5, wherein the solvatochromic colorant is configured to absorb less than about 80%/cm, more specifically less than about 90%/cm and in particular less than about 95%/cm of light with a wavelength between about 380 nm to about 750 nm, when soluted.

7. The drawing substrate according to aspect 5, wherein the hydrochromic colorant is configured to absorb less than about 80%/cm, more specifically less than about 90%/cm and in particular less than about 95%/cm of light with a wavelength between about 380 nm to about 750 nm, when soluted in water.

8. The drawing substrate according to any one of aspects 2 to 7, wherein the first layer comprises a second colorant, more specifically a non-solvatochromic colorant and in particular a non-hydrochromic colorant.

9. The drawing substrate according to any one of aspects 2 to 8, wherein the second layer comprises a hygroexpansible material.

10. The drawing substrate according to any one of aspects 3 to 9, wherein the carrier material is hygroinert.

11. The drawing substrate according to any one of aspects 3 to 10, wherein the second layer comprises a hygromorphic material.

12. The drawing substrate according to aspect 11, wherein the hygromorphic material comprises a first material and a second material, wherein the first material is configured to absorb more water compared to the second material, in particular wherein the first material is a hygroexpansible material and the second material is a hygroinert material.

13. The drawing substrate according to aspect 12, wherein the first material forms a first layer of the hygromorphic material and the second material forms a second layer of the hygromorphic material.

14. The drawing substrate according to aspect 12 or 13, wherein the hygroexpansible material is configured to swell and the hygroinert material is configured not to swell, and/or wherein the hygroexpansible material is hydrophilic and the hygroinert material is hydrophobic.

15. The drawing substrate according to any one of aspects 12 to 14, wherein the hygroexpansible material comprises a hydrogel.

16. The drawing substrate according to any one of aspects 12 to 15, wherein the first material comprises pollen paper, reduced graphene oxide, *Bacillus subtilis* spores, CNT-paper, and/or polydopamine-reduced graphene oxide.

17. The substrate according to any one of aspects 12 to 16, wherein the second material comprises a toner ink, in particular a toner ink comprising an ester of an acrylic ester, iodine-doped reduced graphene oxide, polyimide, partially reduced graphene oxide-polypyrrole, graphite, biaxially oriented polypropylene, SU-8, NOA63, poly (methyl methacrylate) and/or a styrene-acrylate copolymer.

18. The substrate according to any one of aspects 11 to 17, wherein the hygromorphic material comprises hydroxyethyl cellulose with graphene oxide, in particular wherein the graphene oxide and the hydroxyethyl cellulose are cross-linked by citric acid.

19. The substrate according to any one of aspects 11 to 18, wherein the first material comprises oxidized and methacrylated alginate and the second material comprises methacrylated gelatin, in particular wherein the oxidized and methacrylated alginate and the methacrylated gelatin are cross-linked.

20. The drawing substrate according to any preceding aspect, wherein the first structure comprises a third layer, wherein the second layer of the first structure is disposed between the third layer and the first layer of the first structure.

21. The drawing substrate according to aspect 20, wherein the third layer comprises a second fabric, more specifically wherein the second fabric comprises polymer fibers and in particular wherein the polymer fibers comprise polyamide, polyethylene terephthalate, polyester and/or polyethylene.

22. The drawing substrate according to any preceding aspect, wherein the first structure has the form of a layer.

23. The drawing substrate according to any preceding aspect, wherein the second structure has the form of a layer.

24. The drawing substrate according to any preceding aspect, wherein the second structure is non-hygromorphic.

25. The drawing substrate according to any preceding aspect, wherein the second structure comprises a hygroinert and/or water-resistant material, more specifically water resistant paper, water resistance cardboard, Bisphenol A poly-free polymer, polyester paper, and/or polyethylene paper.

26. The drawing substrate according to any preceding aspect, wherein the first structure is attached to the second structure by an adhesive, in particular a water-resistant adhesive.

27. The drawing substrate according to any preceding aspect, wherein the first structure comprises a first section and a second section, wherein the first section is attached to the second structure and the second section comprises a free end.

28. The drawing substrate according to any preceding aspect, wherein the second structure comprises a solvatochromic colorant and/or a non-solvatochromic colorant.

29. The drawing substrate according to any one of aspects 11 to 28, wherein the hygromorphic material has a deformability between about 0.02/cm*%-relative air humidity to about 0.25/cm*%-relative air humidity.

30. The drawing substrate according to any one of aspects 11 to 29, wherein the hygromorphic material exhibits an increase of the maximum bending curvature of between about 1.0 cm−1 to about 5.0 cm−1, more specifically of between about 2.0 cm−1 to about 4.0 cm−1, and in particular of between about 2.5 cm−1 to about 3.5 cm−1, when a water content within the hygroexpansible material is increased from about 20 wt.-% to about 100 wt.-%, relative to the maximum water absorption capacity of the hygroexpansible material.

31. The drawing substrate according to any one of aspects 11 to 30, wherein the hygromorphic material is configured to expand in at least one direction from about 0.4% to about 1.6%, when the water content within the hygroexpansible material is increased from about 20 wt.-% to about 70 wt.-%, relative to the total weight of the hygroexpansible material.

32. The drawing substrate according to any preceding aspect, wherein the second structure is attached to a carrier structure.

33. The drawing substrate according to any preceding aspect, wherein the first structure comprises a mechanochromic material, in particular in the form of a mechanochromic layer.

34. The drawing substrate according to aspect 33, wherein the mechanochromic material comprises mechanochromic fibers, in particular mechanochromic polymer fibers.

35. The drawing substrate according to aspect 32 to 33, wherein the mechanochromic layer has a thickness between about 1 μm to about 2000 μm, more specifically between about 5 μm to about 400 μm, and in particular between about 10 μm to about 200 μm.

36. The drawing substrate according to any one of aspects 33 to 35, wherein the mechanochromic material comprises a photonic material, a piezophotonic material, a microcrack structure material and/or a mechanophore, in particular a mechanophore-linked polymer.

37. The drawing substrate according to aspect 36, wherein the mechanophore is configured to undergo a ring-opening under mechanical stress, more specifically a reversible ring-opening under mechanical stress and in particular to transform from a spirocyclic form to a ring-opening form under mechanical stress.

38. The drawing substrate according to any one of aspects 33 to 37, wherein the mechanochromic material comprises a mechanochromic polymer, more specifically a mechanochromic polymer comprising a rhodamine and in particular a mechanochromic rhodamine spirolactam micellar hydrogel.

39. The drawing substrate according to any one of aspects 33 to 38, wherein the mechanochromic material comprises spheres, more specifically wherein the spheres are polymer spheres and in particular wherein the polymer spheres comprise a copolymer of methyl methacrylate, butyl acrylate and methacrylic acid.

40. The drawing substrate according to any one of aspects 33 to 39, wherein the mechanochromic material comprises a latex, more specifically wherein the latex comprises the polymer spheres and in particular wherein the latex comprises the polymer spheres and graphene.

41. The drawing substrate according to aspect 40, wherein the polymer spheres have a size between about 100 nm to about 400 nm, more specifically between about 200 nm to about 300 nm.

42. The drawing substrate according to any one of aspects 33 to 41, wherein the mechanochromic material has a graphene content between about 0.001 wt.-% to about 0.1 wt.-%, more specifically between about 0.005 to about 0.02 wt.-% relative to the total weight of the polymer spheres.

43. The drawing substrate according to any one of aspects 40 to 42, wherein the latex has a water content between about 1 wt.-% to about 30 wt.-%, more specifically between about 5 wt.-% to about 15 wt.-% and in particular between about 8 wt.-% to about 12 wt.-%, relative to the total weight of the latex.

44. The drawing substrate according to any one of aspects 33 to 43, wherein the mechanochromic material comprises silica particles and poly(ethylene glycol) phenyl ether acrylate rubber.

45. The drawing substrate according to any one of aspects 33 to 44, wherein the mechanochromic material comprises polystyrene spheres, at least one aligned carbon nanotubes sheet and PDMS fibers.

46. The drawing substrate according to any one of aspects 33 to 45, wherein the mechanochromic material comprises poly(butyl acrylate) spheres, 2-ethylhexyl acrylate and a polyacrylic acid hydrogel.

47. The drawing substrate according to any one of aspects 33 to 46, wherein a color change of the mechanochromic material is reversible.

48. The drawing substrate according to any one of aspects 33 to 47, wherein the mechanochromic material is configured to change color when exposed to a mechanical force between about 0.1 N to about 5 N.

49. The drawing substrate according to any one of aspects 33 to 48, wherein the mechanochromic material is configured to change color when stretched by between about 50% to about 500%.

50. The drawing substrate according to any one of aspects 33 to 49, wherein the mechanochromic material is configured to change color when exposed to a mechanical force between about 0.3 MPa to about 3 MPa.

51. The drawing substrate according to any preceding aspect, wherein the drawing substrate is disposed within a drawing book.

52. A system comprising:
the drawing substrate according to any preceding aspect, and
a writing instrument, wherein the writing instrument is configured to dispense a liquid medium comprising water.

The invention claimed is:

1. A drawing substrate, wherein the drawing substrate comprises a first structure attached to a second structure,
wherein the first structure is hygromorphic, and
wherein the first structure comprises a first section and a second section, the first section being attached to the second structure by an adhesive, and the second section comprising a free end,
wherein the first structure comprises a first layer and a second layer, wherein the first layer comprises a carrier material, and wherein the carrier material is at least one of porous or flexible.

2. The drawing substrate according to claim 1, wherein the carrier material comprises a first fabric comprising polymer fibers.

3. The drawing substrate according to claim 2, wherein the polymer fibers comprise polyamide, polyethylene terephthalate, polyester and/or polyethylene.

4. The drawing substrate according to claim 1, wherein the first layer comprises a solvatochromic colorant or a hydrochromic colorant.

5. The drawing substrate according to claim 4, wherein the solvatochromic colorant is configured to absorb less than about 80%/cm of light with a wavelength between about 380 nm to about 750 nm, when soluted.

6. The drawing substrate according to claim 1, wherein the second layer comprises a hygroexpansible material.

7. The drawing substrate according to claim 1, wherein the carrier material is hygroinert.

8. The drawing substrate according to claim 1, wherein the second layer comprises a hygromorphic material.

9. The drawing substrate according to claim 8, wherein the hygromorphic material comprises a hygroexpansible material and a hygroinert material, wherein the hygroexpansible material is configured to absorb more water compared to the hygroinert material.

10. The drawing substrate according to claim 1, wherein the second structure is non-hygromorphic.

11. The drawing substrate according to claim 9, wherein the hygromorphic material exhibits an increase of maximum bending curvature of between about 1.0 cm-1 to about 5.0 cm-1, when a water content within the hygroexpansible material is increased from about 20 wt.-% to about 100 wt.-%, relative to a maximum water absorption capacity of the hygroexpansible material.

12. The drawing substrate according to claim 1, wherein the adhesive is water-resistant, and wherein the second section does not include the adhesive.

13. The drawing substrate according to claim 12,
wherein the first layer further includes a solvatochromic colorant or a hydrochromic colorant; and
wherein the second layer includes a hygroexpansible or hygromorphic material.

14. The drawing substrate according to claim 13, wherein the second structure is non-hygromorphic.

15. The drawing substrate according to claim 14, wherein the carrier material is hygroinert.

16. The drawing substrate according to claim 15, wherein the solvatochromic colorant is configured to absorb less than about 80%/cm of light with a wavelength between about 380 nm to about 750 nm, when soluted.

17. A drawing substrate, wherein the drawing substrate comprises a first structure attached to a second structure,
wherein the first structure is hygromorphic, and
wherein the first structure comprises a first section including a mechanochromic material and a second section, the first section attached to the second structure by an adhesive, and the second section comprising a free end.

18. The drawing substrate according to claim 17, wherein the mechanochromic material is a mechanochromic layer.

19. A system comprising:
a drawing substrate including a first structure attached to a second structure, wherein the first structure is hygromorphic, wherein the first structure comprises a first section and a second section, the first section attached to the second structure by an adhesive, and wherein the second structure includes a free end; and
a writing instrument, wherein the writing instrument is configured to dispense a liquid medium comprising water.

20. The system of claim 19, wherein the first section includes a solvatochromic colorant or a hydrochromic colorant.

* * * * *